United States Patent [19]

Shigematsu et al.

[11] Patent Number: 5,701,188

[45] Date of Patent: Dec. 23, 1997

[54] CHROMATIC DISPERSION COMPENSATOR AND CHROMATIC DISPERSION COMPENSATING OPTICAL COMMUNICATION SYSTEM

[75] Inventors: Masayuki Shigematsu; Yasushi Koyano, both of Kanagawa, Japan

[73] Assignee: Sumitomo Electric Industries, Ltd., Osaka, Japan

[21] Appl. No.: 535,902

[22] Filed: Sep. 28, 1995

[30] Foreign Application Priority Data

Mar. 15, 1995 [JP] Japan .................. P.HEI. 7-055286

[51] Int. Cl.$^6$ .................................................. H04B 10/00
[52] U.S. Cl. ........................................... 359/161; 359/130
[58] Field of Search .................................. 359/127, 130, 359/134, 161, 173; 385/15, 24

[56] References Cited

U.S. PATENT DOCUMENTS

| | | | |
|---|---|---|---|
| 4,953,939 | 9/1990 | Epworth | 385/15 |
| 5,243,609 | 9/1993 | Huber | 372/19 |
| 5,404,413 | 4/1995 | Delavaux et al. | 385/15 |
| 5,410,624 | 4/1995 | Morkel | 385/24 |

OTHER PUBLICATIONS

Hill et al, A periodic In-Fiber Bragg Gratings for Optical Fiber dispersion Compensation, Proceedings of the 1994 Optical Fiber Communication Conference 1994.

Onishi et al, High Performance Dispersion-Compensating Fiber and its Application to Upgrading of 1.31 μm Optimized System, Proceeding ECOC '93 pp. 357-360.

Belou, The Realization of Broad-Band Dispersion Compensation Using the Multicladding Waveguide Structure, Proceedings ECOC '93 pp. 349-352.

*Primary Examiner*—Wellington Chin
*Assistant Examiner*—Rafael Bacares
*Attorney, Agent, or Firm*—Cushman Darby & Cushman IP Group of Pillsbury Madison & Sutro LLP

[57] ABSTRACT

A chromatic dispersion compensator includes an optical circulator or a directional coupler having a first, second and third ports; an input transmission path connected to the first port; an output transmission path connected to the third port; a chirped grating connected to the second port; and a dispersion compensating fiber connected to at least one of the first, second and third ports. The dispersion compensating fiber and the chirped grating have chromatic dispersion characteristics which are opposite to the chromatic dispersion characteristics of the input and output transmission paths. In the wavelength compensator, the optical signal is incident into the first port from the input transmission path, and is made to go out to the chirped grating from the second port. Further, the optical signal is incident from the chirped grating to return to the second port, and is made to go to the output transmission path from the third port.

26 Claims, 3 Drawing Sheets

CHROMATIC DISPERSION COMPENSATOR AND CHROMATIC DISPERSION COMPENSATING OPTICAL COMMUNICATION SYSTEM

BACKGROUND OF THE INVENTION

1. Field of the Invention

The present invention relates to a chromatic dispersion compensator for compensating chromatic dispersion in a transmission path of an optical fiber communication system and relates to a chromatic dispersion compensating optical communication system using such a chromatic dispersion compensator.

2. Description of the Related Art

Chromatic dispersion in an optical fiber used as a transmission path in an optical digital transmission system, causes a lowering of transmission quality. This occurs because chromatic dispersion and chirping produced by direct modulation of a semiconductor laser as a transmitter are coupled to generate waveform distortion. The degradation of transmission quality caused by waveform distortion becomes more remarkable as the bit rate increases. For example, in the case of 10 Gbps, it is necessary for the waveform distortion (spreading) to be controlled so that it is sufficiently smaller than the time width of one slot, that is, about 10 ps which is one-tenth as much as ¹/₁₀ Gbps=100 ps.

In addition to the recent improvement in bit rate, the distance of repeaterless transmission has been elongated with the advent of an Er-doped optical fiber amplifier having an amplifying function in a 1.55 µm band in which a silica based optical fiber exhibits the lowest transmission loss, the necessity of delicately controlling the value of chromatic dispersion has arisen even when a dispersion shifted fiber (DSF) having zero dispersion wavelength in the 1.55 µm band is used as a transmission path. For example, there is used a chromatic dispersion compensating technique in which accumulated chromatic dispersion is cancelled by a fiber having chromatic dispersion with an opposite sign at each relay point.

Further, when a 1.55 µm-band optical fiber amplifier is used in the transmission path of a 1.3 µm-band single mode fiber (1.3 SMF) having been already installed or in the transmission path of a very low loss pure silica core fiber, large positive chromatic dispersion of these fibers in the 1.55 µm band becomes a problem. Therefore, a dispersion compensating fiber having large negative chromatic dispersion in the 1.55 µm wavelength band has been developed. Such a dispersion compensating fiber is disclosed in ELECTRONICS LETTERS, Vol. 30, No. 2, (Jan. 20, 1994), pp. 161–162.

Considering further that the capacity will be increased more and more in the future, a wavelength division multiplexing transmission method (WDM) promises a bright future. In this case, it is necessary for chromatic dispersion to be zero in a wavelength range of the optical signal being used. However, chromatic dispersion itself has dependency on wavelength. In the case of a matched cladding type fiber, the slope of dispersion, that is, the dispersion slope, is generally positive. Accordingly, it is difficult to set the chromatic dispersion to zero over a wide wavelength range.

In order to solve this problem, a chromatic dispersion flattened fiber in which chromatic dispersion is approximately zero in a wide wavelength range is used as a transmission path. Further, a dispersion compensating fiber having a negative dispersion slope has been developed, for example, as disclosed in European Conference on Optical Communication '94, pp. 681–684. However, it is difficult to produce these fibers because these fibers are complex in the form of refractive index distribution so as to be not controllable.

On the other hand, a chirped grating has been proposed as on way of compensating chromatic dispersion, for example, as disclosed in Optical Fiber Communication Conference '94, postdeadline paper-2, PD2-1 to PD2-4. First, a fiber grating will be described. The fact that the refractive index of a core portion of a Ge-added core optical fiber is increased when ultraviolet rays of wavelength near 240 nm are radiated onto the Ge-added core optical fiber is known by Inoue et al, "Generation of Fiber Grating and Application thereof", SHINGAKU-GIHOU, OPE94-5, Institute of Electronics, Information and Communication Engineers of Japan. A periodic refractive index change is formed in the fiber core by using the ultraviolet rays induced refractive index change, by which a diffraction grating can be obtained so that a specific wavelength can be reflected by the diffraction grating.

FIG. 5 is an explanatory view for explaining the chirped grating. In the drawing, the reference numeral 31 designates an optical signal of wavelength $\lambda_1$; 32, an optical signal of wavelength $\lambda_2$; 33, an optical signal of wavelength $\lambda_3$ 34, an optical signal of wavelength $\lambda_4$; and 35, an optical fiber. The relations between the magnitudes of the wavelengths are $\lambda_1 > \lambda_2 > \lambda_3 > \lambda_4$. The chirped grating operates so that the wavelength reflected by the aforementioned diffraction grating is shifted in the direction of the length of the fiber, that is, chirped. Chromatic dispersion can be compensated by the chirped grating. The optical fiber 35 a the core portion in which the refractive index is changed by the ultraviolet rays induced refractive index change. Respective optical signals 31 to 34 of wavelengths $\lambda_1$ $\lambda_4$ incident to the optical fiber from the left in the drawing are reflected at intermediate portions so as to return to the incident side.

The refractive index change, that is, the period of the grating is designed so as to be gradually reduced from the incident side toward the right so that an optical signal of a longer wavelength is reflected at a position nearer the incident side. Further, by writing the grating so that the percentage of the change of the period of the grating is reduced as the wavelength becomes longer, the dispersion slope can be selected to be negative. Incidentally, because chromatic dispersion is a slope of propagation delay time with respect to wavelength, and the dispersion slope is a slope of the chromatic dispersion, the fact that the dispersion slope is negative means that the dependency of propagation delay time on wavelength is convex upwards.

FIG. 6 is an explanatory view for explaining a transmission method. In the drawing, the reference numeral 41 designates an optical signal transmitter for transmitting an optical signal of wavelength $\lambda_1$; 42, an optical signal transmitter for transmitting an optical signal of wavelength $\lambda_2$; 43, an optical signal transmitter for transmitting an optical signal of wavelength $\lambda_3$; 44, an optical signal transmitter for transmitting an optical signal of wavelength $\lambda_4$; 45, a transmission path; 46, amplifiers; 47, a transmission path; 48, a transmission path; 49, an optical receiver for receiving an optical signal of wavelength $\lambda_1$; 50, an optical receiver for receiving an optical signal of wavelength $\lambda_2$; 51, an optical receiver for receiving an optical signal of wavelength $\lambda_3$; and 52, an optical receiver for receiving an optical signal of wavelength $\lambda_4$. Now, amplified WDM transmission of four signal wave lengths, by way of example, will be explained. In the transmitter side, the optical signal transmitters 41 to 44 of wavelengths $\lambda_1$, $\lambda_2$, $\lambda_3$ and $\lambda_4$ are connected to one transmission-side transmission path 45 by a multiplexer not shown. The transmission path 45 is connected to a final amplifier 46 and the receiver side transmission path 48 through one pair of the relay amplifier 46 and the transmission path 47 or a plurality of pairs of the relay amplifiers 46 and the relay transmission paths 47. The transmission path 48 is connected to the optical receivers 49 to 52 of wavelengths $\lambda_1, \lambda_2, \lambda_3$ and $\lambda_4$ by a demultiplexer not shown.

A description will be provided using numerical values. The span of the transmission path 47 is about 80 km. In the case where the transmission path 47 is formed of a 1.3 μm single mode fiber, chromatic dispersion in wavelength of 1550 nm is 17 ps/nm/km, so that the quantity of compensated chromatic dispersion of the overall relay distance is 1360 ps/nm. Even if the amplification wavelength range of the optical fiber amplifier 46 is estimated to be 1550±10 nm, that is, the width of the amplification wavelength range is estimated to be 20 nm, the delay time difference of (1360× 20=27200 ps=) 27.2 ns is required between the optical signal of the longest wavelength and the optical signal of the shortest wavelength in the amplification wavelength range. Consequently, the length of the optical fiber 35 giving the chirped grating shown in FIG. 5 unpratically reaches 2.7 m.

Incidentally, the delay time difference means the propagation time difference between the signal of the shortest wavelength and the signal of the longest wavelength in the wavelength range of the optical signal as a subject. To set the delay time difference to be A[ps], the grating length L[mm] is selected to be $L \approx 3 \times 10^{11}/1.5 \times A \times 10^{-12} \times (\frac{1}{2}) = A \times 10^{-1}$ [mm]. Here, $3 \times 10^{11}$ [mm] is the velocity of light in vacuum, 1.5 is the refractive index of glass, and ($\frac{1}{2}$) is a coefficient obtained by taking into account the round trip of the optical signal.

Accordingly, a method in which gratings of narrow wavelength widths near the respective optical signal wavelengths $\lambda_1$ to $\lambda_4$ are produced and the gratings thus produced are arranged is known by the aforementioned Optical Fiber Communication Conference '94, postdeadline paper-2, PD2-1 to PD2-4. In this method, however, there arises a problem that optical signal wavelengths $\lambda_1$ to $\lambda_4$ in respective systems have to be known in advance, etc.

SUMMARY OF THE INVENTION

It is an object of the present invention is to provide a chromatic dispersion compensator for compensating the chromatic dispersion of a transmission path in an optical communication system and to provide a chromatic dispersion compensating optical communication system using such a chromatic dispersion compensator.

The chromatic dispersion compensator of the present invention includes: an optical signal directing unit such as an optical circulator or a directional coupler having a first, second and third ports, for directing an optical signal input from one of the ports to another port of the ports; an input transmission path connected to the first port; an output transmission path connected to the third port; a chirped grating which is connected to the second port; and a dispersion compensating fiber which is connected to at least one of the first, second and third ports, the dispersion compensating fiber and the chirped grating giving chromatic dispersion characteristic opposite to the chromatic dispersion characteristic of the input and output transmission path. In the chromatic dispersion compensator, the optical signal is incident into the first port from the input transmission path, and is made to go out to the chirped grating from the second port. Further, the optical signal is incident from the chirped grating to return to the second port, and is made to go to the output transmission path from the third port.

In addition, the chromatic dispersion compensating optical communication system of the present invention includes a transmission path and the above described chromatic dispersion compensator which is connected to an intermediate or end portion of the transmission path. If the transmission path is a 1.3 μm-band single mode fiber, the dispersion compensating fiber has negative chromatic dispersion in a wavelength range used. On the other hand, if the transmission path is a 1.55 μm-band single mode fiber, the dispersion compensating fiber has positive chromatic dispersion in a wavelength range used.

According to the chromatic dispersion compensator of the present invention, chromatic dispersion which cannot be compensated only by the dispersion compensating fiber is compensated by the chirped grating, so that not only chromatic dispersion of a transmission path can be compensated in a wide wavelength range but also the grating length can be reduced. Further, by using an optical circulator, loss of insertion can be reduced. Alternatively, by using the directional coupler, the length of the grating can be reduced.

According to the chromatic dispersion compensating optical communication system of the present invention, the chromatic dispersion of the transmission path of the 1.3 μm-band or 1.55 μm-band single mode fiber can be compensated.

BRIEF DESCRIPTION OF THE DRAWINGS

In the accompanying drawings.

PREFERRED EMBODIMENTS OF THE INVENTION

The preferred embodiments of the present invention will be described referring to the accompanying drawings as follows.

Figure 1A:
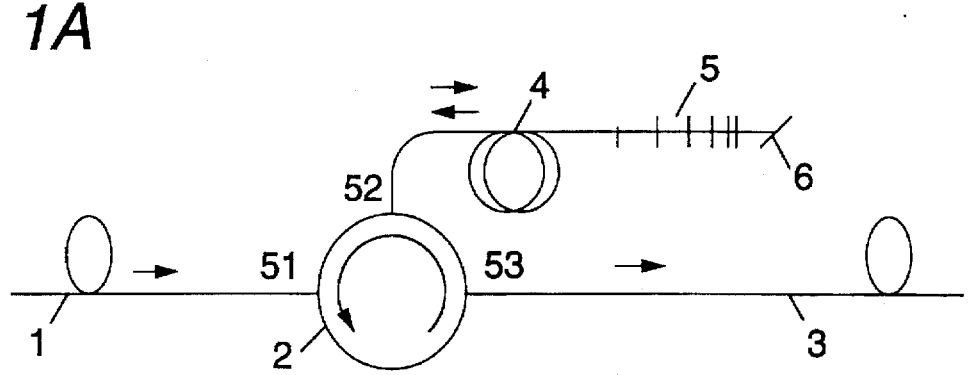
FIG. 1A is an explanatory view for explaining an embodiment of the present invention where an optical circulator is used.
Figure 1B:
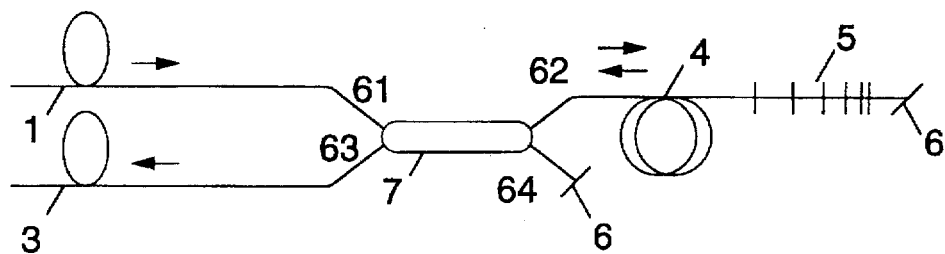
FIG. 1B is an explanatory view for explaining an embodiment of the present invention where a directional coupler is used.

FIG. 1A is an explanatory view for explaining an embodiment of the present invention where an optical circulator is used, and FIG. 1B is an explanatory view for explaining an embodiment of the present invention where a directional coupler is used. In the drawing, the reference numeral 1 represents an input transmission path; 2, an optical circulator; 3, an output transmission path; 4, a dispersion compensating fiber; 5, a chirped grating; 6, a nonreflective terminal; and 7, a directional coupler.

In FIG. 1A, the input transmission path 1 is connected to a first port 51 of the optical circulator 2, and a third port 53 of the optical circulator 2 is connected to the output transmission path 3. Further, a second port 52 of the optical circulator 2 is connected to the dispersion compensating fiber 4. The chirped grating 5 is connected to an end of the dispersion compensating fiber 4. The chirped grating 5 is preferably terminated at the nonreflective terminal 6. For example, the transmission path is formed by a 1.3 µm single mode optical fiber. The chirped grating 5 reflects an optical signal so that chromatic dispersion in the transmission path which cannot be compensated by the round trip's chromatic dispersion characteristic of the dispersion compensating fiber 4 is compensated by a relatively wide wavelength range.

In FIG. 1B, the directional coupler 7 such as, for example, an optical fiber coupler, is used instead of the optical circulator 2 which is a non-reciprocal element shown in FIG. 1A. In FIG. 1B, ports in the left of the directional coupler 7 are referred to as a first port 61 and a third ports 63, and ports in the right of the directional coupler 7 are referred to as a second port 62 and a fourth port 64. The input transmission path 1 is connected to the first port 61. The third port 63 is connected to the output transmission path 3. The second port 62 is connected to the dispersion compensating fiber 4. The fourth port 64 is preferably terminated at the nonreflective terminal 6. Although an insertion loss not lower than 3 dB arises when the directional coupler 7 is used, the loss can be compensated by an amplifier.

Figure 2:
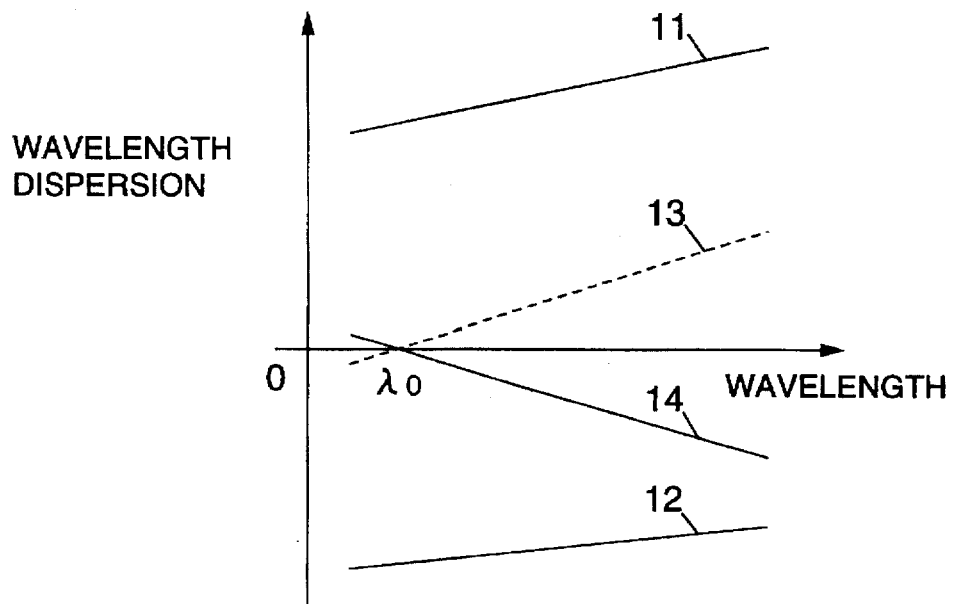
FIG. 2 is a graph for explaining the chromatic dispersion characteristic of the embodiment.

FIG. 2 is a graph for explaining the chromatic dispersion characteristic of the embodiment. The horizontal axis represents the wavelength of an optical signal, and the vertical axis represents chromatic dispersion. The reference numeral 11 represents chromatic dispersion characteristic of the transmission path; 12, round trip's chromatic dispersion characteristic of the dispersion compensating fiber; 13, characteristic obtained by adding the round trip's chromatic dispersion of the dispersion compensating fiber to the chromatic dispersion of the transmission path; and 14, chromatic dispersion characteristic of the chirped grating which has a negative dispersion slope characteristic. The dispersion compensating fiber 4 has negative chromatic dispersion so that the round trip's chromatic dispersion characteristic 12 thereof exhibits chromatic dispersion which is equal in absolute value to but has opposite sign to the chromatic dispersion exhibited by the chromatic dispersion characteristic 11 of the transmission path at a predetermined wavelength $\lambda_0$. As a result, at the predetermined wavelength $\lambda_0$, the chromatic dispersion of the transmission path is compensated so that the value of chromatic dispersion becomes zero. When the chromatic dispersion characteristic 11 of the transmission path is compensated as described above, only a wavelength-dependent component of chromatic dispersion remains as a component which cannot be compensated. This residual characteristic is the characteristic 13 obtained by adding the round trip's chromatic dispersion of the dispersion compensating fiber to the chromatic dispersion of the transmission path.

Therefore, only the wavelength-dependent component of the chromatic dispersion is compensated by the chirped grating having the negative dispersion slope equal in absolute value to but with negative sign to the dispersion slope of the wavelength-dependent component. Consequently, chromatic dispersion after compensation can be set to be a constant value 0 regardless of the wavelength. That is, the chromatic dispersion characteristic 14 of the chirped grating 5 is provided as characteristic which exhibits a value equal in absolute value to but with negative sign to the aforementioned residual characteristic, that is, the characteristic 13 obtained by adding the round trip's chromatic dispersion of the dispersion compensating fiber to the chromatic dispersion of the transmission path.

Referring back again to FIG. 1A, description will be made. An optical signal, for example, having a 1.55 µm band is injected into the optical circulator 2 at the first port 51 thereof through the input transmission path 1 of a 1.3 µm single mode optical fiber, made to go out from the optical circulator 2 at the second port 52 thereof, led to the dispersion compensating fiber 4 and reflected by the chirped grating 5. The reflected optical signal is propagated in the dispersion compensating fiber again, injected into the optical circulator 2 at the second port 52 thereof and made to go out from the optical circulator 2 at the third port 53 thereof toward the output transmission path 3.

Incidentally, the dispersion compensating fiber 4 may be connected to the first port 51 or the third port 53 of the optical circulator 2. Alternatively, two or three dispersion compensating fibers 4 may be used so as to be connected to different ports among the first, second and third ports 51, 52 and 53. When the dispersion compensating fiber 4 is connected to the second port 52 as described above, there arises an advantage in that the required length of the dispersion compensating fiber necessary for obtaining a predetermined delay time can be reduced by half.

Figure 3:
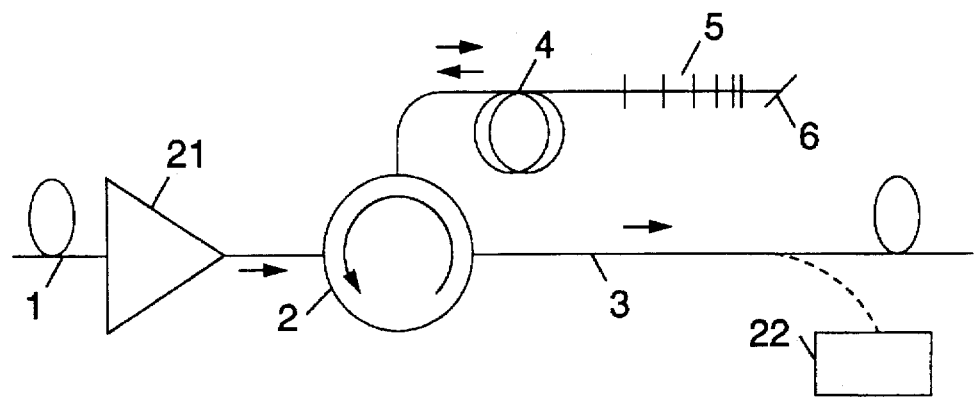
FIG. 3 is an explanatory view for explaining a first modified example of the embodiment of the present invention.

FIG. 3 is an explanatory view for explaining a first modified example of the embodiment of the present invention. In FIG. 3, elements which are the same as those in FIG. 1 are referenced with the same reference numerals, and the description of those elements will be omitted. The reference numerals 21 and 22 represent an amplifier and an optical receiver, respectively. In this modified embodiment, the amplifier 21 such as an optical fiber amplifier, or the like, is inserted into the first port 51 of the optical circulator 2 to thereby compensate the loss of insertion of the dispersion compensating fiber 4 and the chirped grating 5. The transmission path 3 or the optical receiver 22 is connected to the third port 53 of the optical circulator 2.

Figure 4:
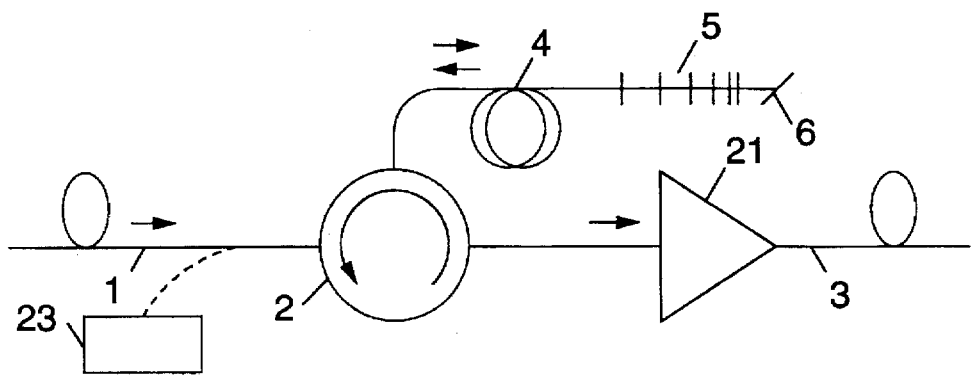
FIG. 4 is an explanatory view for explaining a second modified example of the embodiment of the present invention.
Figure 5:
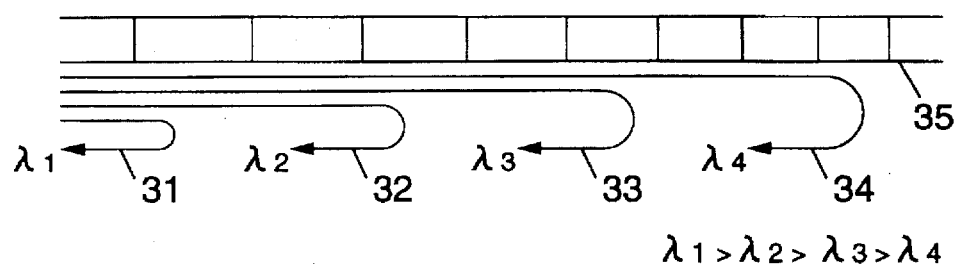
FIG. 5 is an explanatory view for explaining the chirped grating.

FIG. 4 is an explanatory view for explaining a second modified example of the embodiment of the present invention. In FIG. 4, elements which are the same as those in FIGS. 1 and 3 are identified with the same reference numerals, and the description of those elements will be omitted. The reference numeral 23 designates an optical signal receiver. In this modified embodiment, the optical fiber amplifier 21 is inserted into the third port 53 of the optical circulator 2 to thereby compensate the insertion loss of the dispersion compensating fiber 4 and the chirped grating 5. The transmission path 3 or the optical signal transmitter 23 is connected to the first port 51 of the optical circulator 2.

In the aforementioned first and second modified examples, the directional coupler 7 shown in FIG. 1B may be used instead of the optical circulator 2 shown in FIG. 1A. An amplifier function for compensating the loss of insertion of the directional coupler 7 may be given to the amplifier 21.

Figure 6:
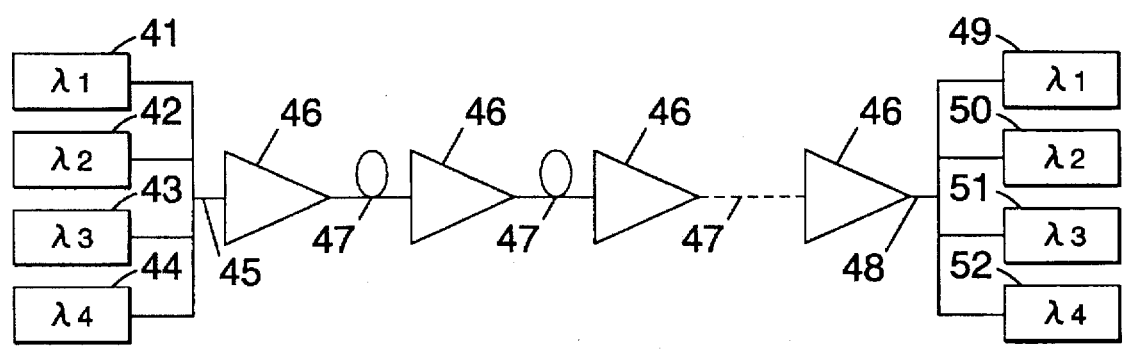
FIG. 6 is an explanatory view for explaining the amplified WDM transmission method.

The chromatic dispersion compensator described above with reference to FIGS. 1A through 4 can be set in an arbitrary portion on transmission paths 45, 47 and 48 in a amplified WDM transmission system shown in FIG. 6. Typically, the chromatic dispersion compensator is provided in the front, inside, or rear of an amplifier 46 so as to be adjacent thereto, so that chromatic dispersion of a transmission path 47 is compensated. The function of the amplifier 21 and/or the function of an amplifier for compensating the loss of insertion of the directional coupler 7 may be given to the amplifier 46.

Referring to FIGS. 6 and 1A, a specific example of the present invention will be explained. First, the case where the transmission path 47 in the four wavelength multiplexed amplified transmission system shown in FIG. 6 is formed by a 1.3 μm single mode fiber will be described. It is assumed that the span of the transmission path 47 is 80 km, and the wavelength of the amplification band of the optical fiber amplifier 46 is 1550±10 nm, that is, the band width is 20 nm. When of wavelength $\lambda_0=1540$ nm, the chromatic dispersion of the 1.3 μm single mode fiber is about 16.5 ps/nm/km and the dispersion slope thereof is about 0.05 ps/nm$^2$/km. Further, when the wavelength 1540 nm, the chromatic dispersion of the dispersion compensating fiber 4 is about −80 ps/nm/km and the dispersion slope thereof is about 0.10 ps/nm$^2$/km. In order to set the chromatic dispersion to zero when the wavelength $\lambda_0=1540$ nm, the required length of the dispersion compensating fiber 4 is made to be (16.5×80/80=)16.5 km. If the optical signal is used so as to make a round trip, the required length of the dispersion compensating fiber 4 is made to be a half of the aforementioned value. In this case, the dispersion slope of the overall transmission path inclusive of the transmission path 47 of the 1.3 μm single mode fiber and the compensation due to the dispersion compensating fiber 4 is made to be (0.05× 80+0.10×16.5=)5.65 ps/nm$^2$.

Accordingly, the delay time difference of $\{(\frac{1}{2})\times 5.65 \times 20^2=\}1130$ ps is required to be generated in the chirped grating 6. Accordingly, the required grating length becomes 11.3 cm. In the conventional method described above, the required grating length is 27.2 m in which the chirped grating 6 is only used. As a result, the required grating length can be reduced to 1/20 or less.

To put the required length of the dispersion compensating fiber 4 in a practical range, it is preferable for the chromatic dispersion of the dispersion compensating fiber 4 to be set to be not larger than −40 ps/nm/km. When the chromatic dispersion of the dispersion compensating fiber 4 is −40 ps/nm/km, the required length of the dispersion compensating fiber 4 becomes (16.5×80/40=)33 km. In the case where the optical signal is used so as to make a round trip, however, the required length of the dispersion compensating fiber 4 is reduced to a half of this value, that is, the required length of the dispersion compensating fiber 4 becomes equal to the length of the aforementioned dispersion compensating fiber 4.

Next, the case where the transmission path 47 is formed by a dispersion shifted fiber will be described. It is assumed that the transmission path 47 is formed by a dispersion shifted fiber of 80 km. In order to avoid the four wave mixing generated in the dispersion shifted fiber, the zero dispersion wavelength is set, for example, to 1570 nm. The dispersion slope is about 0.08 ps/nm$^2$/km. The wavelength of the amplification band of the optical fiber amplifier 46 is set to 1550±10 nm, that is, the band width is set to 20 nm.

First, the case where no dispersion compensating fiber 4 is used will be described as a comparative example. In the case of the wavelength 1550 nm, the chromatic dispersion of the dispersion shifted fiber is $\{0.08\times(-20)\times 80=\}-128$ ps/nm. Accordingly, the required delay time difference in the chirped grating 6 becomes $\{128\times 20=\}2560$ ps. As a result, the required grating length necessary for setting the chromatic dispersion to zero is 25.6 cm.

Next, the case where a 1.3 μm single mode fiber is used as the dispersion compensating fiber 4 will be described. A pure silica core fiber of very low loss is preferably used as the 1.3 μm single mode fiber. The chromatic dispersion of the dispersion shifted fiber at the wavelength of $\lambda_0=1560$ nm is $\{0.08\times(-10)=\}-0.8$ ps/nm/km because the dispersion slope is about 0.08 ps/nm$^2$/km, whereas the chromatic dispersion of the 1.3 μm single mode fiber at the wavelength of $\lambda_0=1560$ nm is 17.5 ps/nm/km and the dispersion slope is about 0.05 ps/nm$^2$/km. In order to set the chromatic dispersion to zero at the wavelength of $\lambda_0=1560$ nm, the required length of the dispersion compensating fiber 4 is made to be $\{0.8\times 80/17.5=\}3.66$ km. However, where the optical signal will make a round trip, the required length is reduced to a half of this value. In this case, the dispersion slope of the overall transmission path inclusive of the transmission path 47 of the dispersion shifted fiber and the compensation due to the dispersion compensating fiber 4 is made to be $\{0.08 \times 80+0.05\times 3.66=\}6.58$ ps/nm$^2$.

Accordingly, the delay time difference of $\{(\frac{1}{2})\times 6.58 \times 20^2=\}1316$ ps is required to be generated in the chirped grating 6. As a result, the required grating length becomes 13.2 cm which is about a half of 25.6 cm in the case where no dispersion compensating fiber 4 is used as described above. That is, the required grating length becomes a value adapted for practical use.

The required grating length in the case where the transmission path 47 is formed by a 1.3 μm single mode fiber is substantially equal to the required grating length in the case where the transmission path 47 is formed by a dispersion shifted fiber.

As is apparent from the above description, in accordance with the present invention, chromatic dispersion which cannot be compensated by the dispersion compensating fiber is compensated by the chirped grating so that not only the chromatic dispersion of the transmission path in an optical fiber communication system can be reduced but also the grating length of the chirped grating can be greatly reduced in a wide wavelength band of the optical fiber amplifier. As a result, waveform distortion caused by combination between chirping produced by direct modulation of a semiconductor laser used as a transmitter and chromatic dispersion becomes low. Thus, lowering of transmission quality can be prevented.

What is claimed is:

1. A chromatic dispersion compensator comprising:

optical signal directing means having first, second and third ports, for directing an optical signal input from one of said ports to another port of said ports;

an input transmission path which is connected to said first port;

an output transmission path which is connected to said third port;

a chirped grating which is connected to said second port; and a dispersion compensating fiber which is connected to at least one of said first, second and third ports, said dispersion compensating fiber and said chirped grating having chromatic dispersion characteristics opposite to the chromatic dispersion characteristics of said input and output transmission paths;

wherein the optical signal is incident into said first port from said input transmission path, the optical signals is made to go out to said chirped grating from said second port, the optical signal is incident from said chirped grating to return to said second port, and the optical signal is made to go to said output transmission path from said third port;

wherein almost all chromatic dispersion is compensated by the dispersion compensation optical fiber, and wherein the chirped grating is arranged so that only a wavelength-dependent component of the residual chromatic dispersion is compensated by the chirped grating, said chirped grating having a dispersion slope opposite to that of the residual chromatic dispersion and substantially equal in absolute value to the dispersion slope of the wavelength-dependent component of the residual chromatic dispersion.

2. A chromatic dispersion compensator according to claim 1, further comprising an optical fiber amplifier which is connected to at least one of said first and third ports.

3. A chromatic dispersion compensator according to claim 1, wherein said optical signal directing means is an optical circulator.

4. A chromatic dispersion compensator according to claim 3, further comprising an optical fiber amplifier which is connected to at least one of said first and third ports.

5. A chromatic dispersion compensator according to claim 1, wherein said optical signal directing means is a directional coupler.

6. A chromatic dispersion compensator according to claim 5, further comprising an optical fiber amplifier which is connected to at least one of said first and third ports.

7. A chromatic dispersion compensator according to claim 5, wherein said optical signal direction means has a fourth port.

8. A chromatic dispersion compensator according to claim 7, wherein said fourth port has a nonreflective terminal.

9. A chromatic dispersion compensator according to claim 1, wherein said chirped grating has a nonreflective terminal.

10. A chromatic dispersion compensating optical communication system, comprising:
  a transmission path comprising a 1.31 μm-band single mode fiber; and
  a chromatic dispersion compensator which is connected to an one of an intermediate and an end portion of said transmission path, said chromatic dispersion compensator comprising:
    optical signal directing means having a first, second and third ports, for directing an optical signal input from one of said ports to another port of said ports;
    an input transmission path which is connected to said first port;
    an output transmission path which is connected to said third port;
    a chirped grating which is connected to said second port; and
    a dispersion compensating fiber which is connected to at least one of said first, second and third ports, said dispersion compensating fiber and said chirped grating having chromatic dispersion characteristics opposite to the chromatic dispersion characteristics of said input and output transmission path, said dispersion compensating fiber having negative chromatic dispersion in a wavelength range used;
  wherein the optical signal is incident into said first port from said input transmission path, the optical signal is made to go out to said chirped grating from said second port, the optical signal is incident from said chirped grating to return to said second port, and the optical signal is made to go to said output transmission path from said third port;
  wherein almost all chromatic dispersion is compensated by the dispersion compensation optical fiber, and
  wherein the chirped grating is arranged so that only a wavelength-dependent component of the residual chromatic dispersion is compensated by the chirped grating, said chirped grating having a dispersion slope opposite to that of the residual chromatic dispersion and substantially equal in absolute value to the dispersion slope of the wavelength-dependent component of the residual chromatic dispersion.

11. A chromatic dispersion compensating optical communication system according to claim 10, wherein said optical signal directing means is an optical circulator.

12. A chromatic dispersion compensating optical communication system according to claim 10, wherein said optical signal directing means is a directional coupler.

13. A chromatic dispersion compensating optical communication system according to claim 10, wherein said chromatic dispersion compensator further comprising an optical fiber amplifier which is connected to at least one of said first and third ports.

14. A chromatic dispersion compensating optical communication system according to claim 13, wherein said dispersion compensating fiber has chromatic dispersion equal to or less than −40 ps/nm/km in said wavelength range used.

15. A chromatic dispersion compensating optical communication system according to claim 14, wherein said wavelength range used is in a range of 1540 to 1560 nm.

16. A chromatic dispersion compensating optical communication system according to claim 10, wherein said dispersion compensating fiber has chromatic dispersion equal to or less than −40 ps/nm/km in said wavelength range used.

17. A chromatic dispersion compensating optical communication system according to claim 16, wherein said wavelength range used is in a range of 1540 to 1560 nm.

18. A chromatic dispersion compensating optical communication system according to claim 10, wherein said wavelength range used is in a range of 1540 to 1560 nm.

19. A chromatic dispersion compensating optical communication system, comprising:
  a transmission path comprising a 1.55 μm-band single mode fiber; and
  a chromatic dispersion compensator which is connected to one of an intermediate and an end portion of said transmission path, said chromatic dispersion compensator comprising:
    optical signal directing means having first, second and third ports, for directing an optical signal input from one of said ports to another port of said ports;
    an input transmission path which is connected to said first port;
    an output transmission path which is connected to said third port;
    a chirped grating which is connected to said second port; and
    a dispersion compensating fiber which is connected to at least one of said first, second and third ports, said dispersion compensating fiber and said chirped grating having chromatic dispersion characteristics opposite to the chromatic dispersion characteristics of said input and output transmission paths, said dispersion compensating fiber having positive chromatic dispersion in a wavelength range used;
  wherein the optical signal is incident into said first port from said input transmission path, the optical signal is made to go out to said chirped grating from said second port, the optical signal is incident from said chirped grating to return to said second port, and the optical signal is made to go to said output transmission path from said third port;

wherein almost all chromatic dispersion is compensated by the dispersion compensation optical fiber, and wherein the chirped grating is arranged so that only a wavelength-dependent component of the residual chromatic dispersion is compensated by the chirped grating, said chirped grating having a dispersion slope opposite to that of the residual chromatic dispersion and substantially equal in absolute value to the dispersion slope of the wavelength-dependent component of the residual chromatic dispersion.

20. A chromatic dispersion compensating optical communication system according to claim 19, wherein said optical signal directing means is an optical circulator.

21. A chromatic dispersion compensating optical communication system according to claim 19, wherein said optical signal directing means is a directional coupler.

22. A chromatic dispersion compensating optical communication system according to claim 19, wherein said chromatic dispersion compensator further comprising an optical fiber amplifier which is connected to at least one of said first and third ports.

23. A chromatic dispersion compensating optical communication system according to claim 22, wherein said wavelength range used is in a range of 1540 to 1560 nm.

24. A chromatic dispersion compensating optical communication system according to claim 19, wherein said wavelength range used is in a range of 1540 to 1560 nm.

25. A chromatic dispersion compensating optical communication system according to claim 19, wherein said dispersion compensating fiber is a 1.3 μm-band single mode fiber.

26. A chromatic dispersion compensating optical communication system according to claim 25, wherein said wavelength range used is in a range of 1540 to 1560 nm.

* * * * *